Jan. 16, 1968   R. M. CHANNON   3,363,272
PORTABLE SUN BATHING DEVICE
Filed Sept. 8, 1965
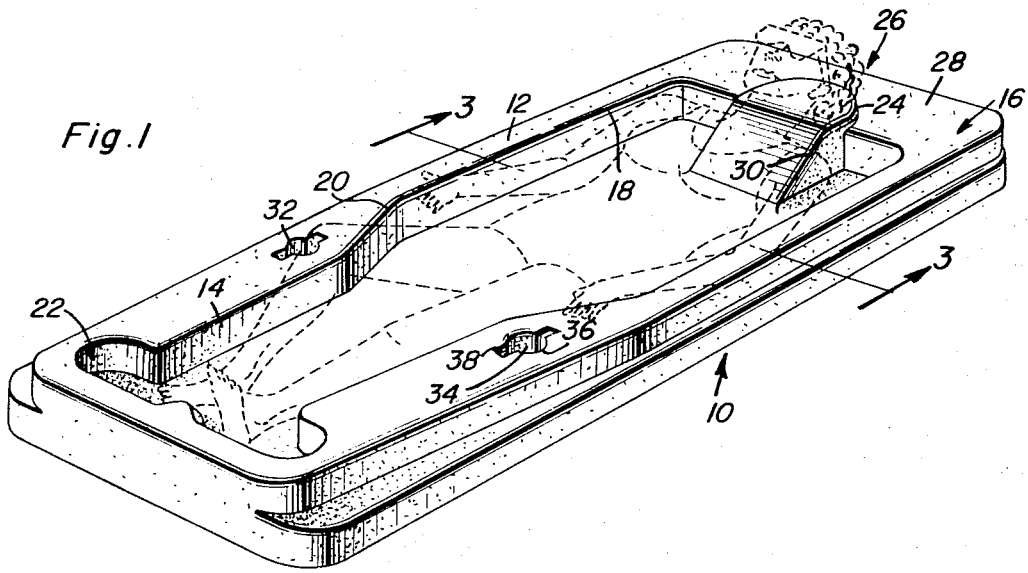
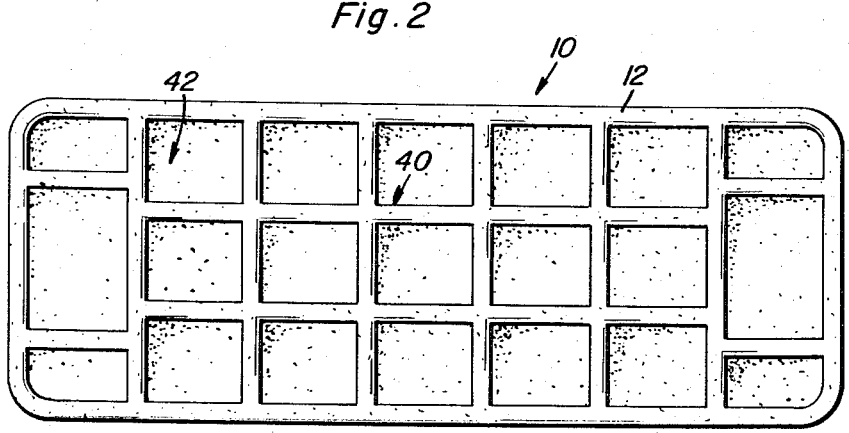
Robert M. Channon
INVENTOR.

United States Patent Office 3,363,272
Patented Jan. 16, 1968

3,363,272
PORTABLE SUN BATHING DEVICE
Robert M. Channon, 524 Leeridge Terrace,
Glendale, Calif. 91206
Filed Sept. 8, 1965, Ser. No. 485,853
6 Claims. (Cl. 9—348)

ABSTRACT OF THE DISCLOSURE

For use on patio, sun deck, yard—at beach or in pool. Provides easy-to-carry float for sun bathing. Pour water into user's body confining cavity. Evaporation of water keeps occupant comfortably cool. The confined water activates a myriad of shimmering mirrors reflecting sun's rays for outdoor tan. Won't tip or roll. Has built-in container wells and a built-in head rest for relaxation.

---

This invention relates to a sun bathing device and more particularly to a portable device for use in sun bathing including means for allowing the user of the device to enjoy the natural rays of the sun while comfortable and effectually protected from the harmful effects thereof.

For centuries, people have been enjoying the natural rays of the sun in order to obtain the health-giving benefits therefrom by exposing their uncovered bodies to the sun rays. In the past, the usual way a sun bather took advantage of the sun rays was by merely stripping and lying on the ground thereby exposing his body thereto. This manner of sun bathing, of course, has certain disadvantages, namely that the ground is uncomfortable, that undue exposure to the sun rays can be harmful and that even normal exposure to sun rays may cause excessive perspiration and may lead to heat exhaustion or the like.

Accordingly, it is an object of the present invention to provide a sun bathing device which enables the user to be comfortable while enjoying the natural rays of the sun while at the same time obtaining the full benefits thereof, limiting the amount of perspiring due to exposure to the sun rays and allowing the user to be quite cool and comfortable during the sun bath.

In accordance with the above object, it is a further object of the present invention to provide a sun bathing device which is lightweight and portable thereby enabling practically anyone having use therefor to move it about, the device including a body receiving and nesting cavity therein in which a liquid such as water will normally be placed for cooling the body of the user when the device is used on one's patio, sun deck, at the beach, or in a swimming pool, as the case may be.

Another object of the present invention is to provide a sun bathing device which is lightweight and portable and relatively inexpensive to manufacture while at the same time being quite durable and self-shape-sustaining in construction.

It is a still further object of the present invention to provide an easy-to-carry sun bathing device which may be used on the ground, is floatable on a body of water such as a swimming pool or the like, can be used as a patio decoration, children's sand box, as a pallet, pool-side chute, a grease catcher under a car, and for many other and feasible purposes.

It is a final object of the present invention to provide a device which may be cheaply manufactured from readily available materials and which lends itself readily to mass production techniques and which when fabricated provides a new and novel means for sun bathing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the sun bathing device comprising the present invention illustrating one manner of intended use thereof;

FIGURE 2 is a bottom plan view of the sun bathing device illustrated in FIGURE 1; and FIGURE 3 is an enlarged vertical cross-sectional view taken substantially on the plane of the line 3—3 of FIGURE 1.

Referring now to the drawings in greater detail, reference numeral 10 generally denotes the sun bathing device of the present invention. The sun bathing device 10 essentially consists of an elongate body member or pad 12 which is fabricated from lightweight relatively rigid material which is impervious to water such as a molded polystyrene plastic material or the like. The body member 12 has generally planar top and bottom surfaces and the top surface is formed with a contoured body receiving cavity 14 which is preferably approximately 2½ inches deep and 6½ feet long, the body 12 being approximately 7 feet in total length. Further, the body receiving cavity 14 includes a generally rectangular portion 18 which is preferably approximately 24 inches wide, narrowing down at the area indicated by reference numeral 20 to a substantially narrower portion wherein the legs of the user will normally be positioned. The body receiving cavity 14 terminates at its lower end in a foot receiving chamber 22 which is wider than the bottom portion of body receiving chamber 14 thereby enabling the user of the device to spread his feet apart as will be explained below.

A headrest 24 is provided at the head end 26 of the device, the headrest 24 preferably being in an elevated plane approximately one-half inch above the top surface level 28 of the body member. A forwardly downwardly inclined neck and shoulder rest 30 is formed integrally with the headrest 24, merges with the bottom of the cavity and is designed to support the user's shoulders and neck as illustrated in FIGURE 1.

The sun bathing device 10 further includes a pair of article receiving recesses 32 and 34 in the upper face 16 thereof normally adjacent the natural position of the user's hands when the user is in fully extended prone position in the device 10. The recesses 32 and 34 are shaped to include a circular portion 36 and an elongate slot portion 38, thereby enabling each recess to receive either a drinking glass or magazine or other generally round or book-like article.

Referring now to FIGURE 2, it will be observed that the grid like bottom of the device includes a plurality of integrally joined transverse and longitudinal ribs denoted by reference numeral 40 which are formed therein during the fabrication of the device, as for example when the device is being molded or pressed. Thus, a plurality of recesses, generally denoted by reference numeral 42 are formed between the plurality of ribs 40 thus lending to the strength and rigidity of the device 10 while at the same time enabling the device to be extremely light of weight.

The manner of use of the sun bathing device 10 will be explained as follows: as is well known, when a sun bather merely lies in the sun either on the ground or on a pad or the like, the sun rays cause the sun bather to perspire freely and and his skin may be burned to some degree. Accordingly, the sun bathing device of the present invention has been provided in order to enable the sun bather to be comfortable while sun bathing, and to tan faster and substantially eliminate the possibility of being burned by the sun rays, while at the same time relieving the tension normally caused by excessive heat. Water or other cooling liquid is first introduced to a preferred height in the body receiving cavity 14, it being anticipated that only an inch or two of water will be used in the 5½ inch deep cavity. At this point, the user enters the body receiving cavity 14 and may lie either on his stomach or back, the headrest and shoulder and neckrest portion 24 and 30 providing comfort for the user when in either position, the user being able to spread his feet out in the chamber 22. The user normally will stay in the first entered position for a desired length of time, depending upon the degree of intensity of the sun rays. It is anticipated that the range of 15 minutes to one-half hour will be found to be most satisfactory during normal sun bathing conditions. At the end of this first period, the user will turn over, thus immersing the opposite side of his body in the water and exposing the side which was previously immersed to the sun rays. Thus, the body is maintained in a wet condition on the side thereof exposed to the sun rays, and a partially submerged condition on the other side, therefore resulting in the user's skin being air cooled as the sun rays evaporate the water on the exposed side of his body. By constant turning, the user is able to remain cool and comfortable while at the same time providing a maximum exposure to the sun rays wherein the user is able to tan faster while eliminating possible burns or over exposure. Further, the water in the chamber 14 provides a reflective surface for the sun rays thereby increasing the amount of body surface being exposed to such rays.

Due to the substantially hollow configuration of the sun bathing device 10 and to the lightweight plastic polystyrene material used in the construction thereof, the device will be found to be floatable in water as well as being used as normally intended on the ground.

This unsinkable float is unique for sunning in a swimming pool. Its design enables a user to sun-bathe without getting her hair wet. It will not tip precariously or roll over dangerously and has built-in container pocketing wells for ready use. The water which is trapped in the occupant's receiving cavity provides a myriad of tiny mirrors which concentrate and reflect the sun's rays for a fast but acceptable outdoor tan.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sun bathing device for a reclining human body comprising an elongate body member having top and bottom surfaces, an elongate body receiving cavity formed in the top surface of said body member, said body receiving cavity being adapted to receive fluid as well as the body of a sun bather, said body member having a substantially flat ground engaging bottom surface opposite said top surface whereby said device may be placed flatwise against a level supporting surface, said device being fabricated from rigid polystyrene plastic foam material whereby it is floatable in a body of water, said top surface having a foot receiving chamber communicably joined to one end of said body receiving cavity, said cavity being widest at the end thereof opposite said foot receiving chamber and tapering inwardly therefrom to a relatively narrow portion joined to said foot receiving chamber.

2. The combination of claim 1 wherein said body receiving cavity is characterized by a head end and a foot end, a headrest member formed on said body member adjacent said head end and a foot receiving chamber formed on said body member adjacent said foot end, and means for supporting a user's neck and shoulders in said body receiving cavity adjacent and oriented and combined with said head end.

3. The combination of claim 2 wherein said supporting means comprises an inclined supporting member sloping downwardly into said body receiving cavity from said headrest and terminating and merging with the bottom wall of said body receiving cavity.

4. The combination of claim 3 wherein the top surface of said body member includes a plurality of article receiving recesses therein for supporting articles in substantially upright, readily accessible position.

5. A portable reclining and sun bathing device designed and adapted to be used atop one's front or back lawn, patio, sun deck, at the beach or as a raft-like float in a swimming pool comprising: an elongated one piece pad having generally planar top and bottom surfaces, said pad being made of moldable self-shape-sustaining non-porous buoyant plastic material, the top surface of said pad being recessed, said recess defining an elongated cavity having marginal edges spaced inwardly from the respectively encompassing marginal edges of said pad, said cavity being relatively shallow, imperforate, contoured to accommodatingly receive and partially enclose the body of a reclining sun bather or other user and being adapted to be charged with and contain body immersing, cooling and sun reflecting water in the manner and for the diversified purposes desired.

6. The reclining and sun bathing device defined in and according to claim 5 and wherein said cavity is characterized by distinguishable head and foot ends, the foot end portion being shaped to accommodate the coacting feet of the occupant of the cavity, said head end being provided at a median portion thereof with an upwardly and outwardly inclined neck rest and a headrest, said neck rest merging into and constituting a companion part of the headrest, said headrest being integral with a a coacting top surface of the pad and being shaped to prop the user's head and being disposed in a slightly elevated generally horizontal plane.

References Cited

UNITED STATES PATENTS

| | | | |
|---|---|---|---|
| 1,329,687 | 2/1920 | Underwood | 9—11 |
| 1,392,533 | 10/1921 | Smyth | 9—2 |
| 3,117,327 | 1/1964 | Mathew | 9—347 |

MILTON BUCHLER, Primary Examiner.

T. W. BUCKMAN, Assistant Examiner.